April 27, 1965    F. C. MOLTER, SR    3,180,657
EQUALIZED TRAILER TOW BAR ASSEMBLY
Filed Aug. 16, 1963

INVENTOR
Fred C. Molter Sr.

United States Patent Office 3,180,657
Patented Apr. 27, 1965

3,180,657
EQUALIZED TRAILER TOW BAR ASSEMBLY
Fred C. Molter, Sr., 1319 Birch Ave., Superior, Wis.
Filed Aug. 16, 1963, Ser. No. 302,659
4 Claims. (Cl. 280—489)

This invention relates to vehicles and, more particularly, to automotive vehicles and trailers.

It is an object of the present invention to provide an equalized trailer tow bar assembly for connecting a trailer to a towing vehicle with a minimum of side sway and vibration.

Another object of the present invention is to provide an equalized trailer tow bar assembly for trailers and towing vehicles which will provide for minimum play between connected parts, while allowing limited angular movement between the tongue of the trailer and the draw bar of the vehicle in a vertical plane, cushioning vertical rocking and dampening side sway.

Still an additional object of the present invention is to provide an equalized trailer tow bar assembly of the aforementioned type which can be readily applied, conveniently adjusted, and quickly serviced whenever required.

All of the foregoing and still further objects and advantages of this invention will become apparent from a study of the following specification, taken in connection with the accompanying drawings, wherein.

Figure 1:
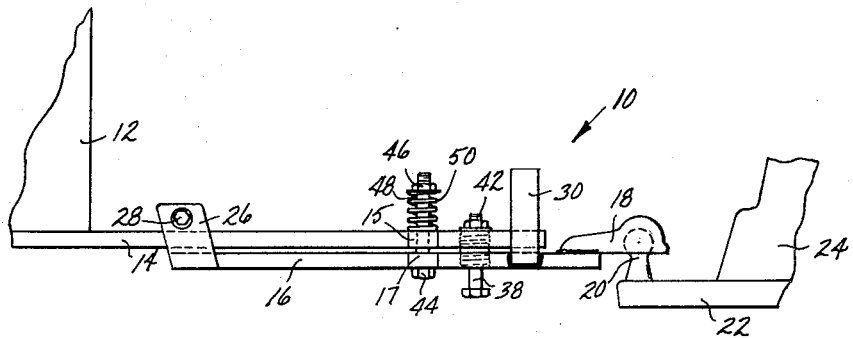
FIGURE 1 is a side elevational view of an equalized trailer tow bar assembly made in accordance with the present invention in actual use.
Figure 2:
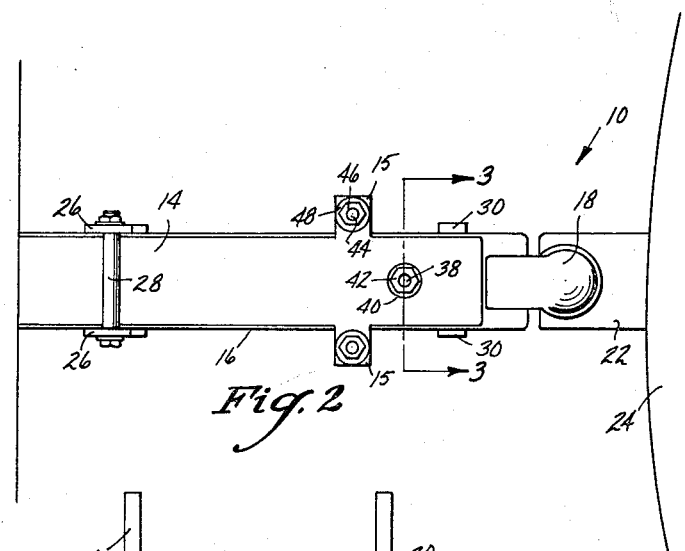
FIGURE 2 is a top plan view of the assembly shown in FIGURE 1.
Figure 3:
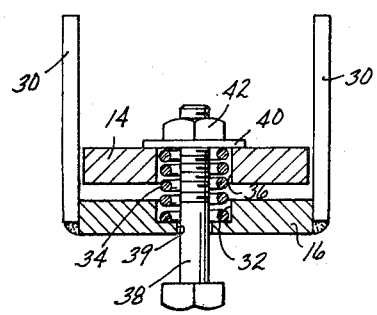
FIGURE 3 is an enlarged transverse cross sectional view taken along line 3—3 of FIGURE 2.

Referring now to the drawing, an equalized trailer tow bar assembly 10 made in accordance with the present invention is shown in actual use between the trailer 12 and a towing vehicle 24.

The equalized trailer tow bar assembly 10 includes a tongue 14 secured at its rear end to the frame of the trailer 12, and an equalizer bar 16 having a trailer hitch 18 at its forward end for connection to the hitching post 20 of the draw bar 22 of the vehicle 24.

The mid portion of the equalizer bar 16 underlies the mid portion of the tongue 14. The rear end of the equalizing bar 16 is provided with a hanger which includes a pair of upstanding side plates 26 that define a channel which receives a central portion of the tongue 14 therewithin. A cross bar 28 extends between the side plates 26 and limits movement of the tongue 14 and equalizing bar 16 in a direction away from each other.

The equalizing bar 16 is provided with a pair of upstanding guide plates 30 which form a channel within which the forward end of the tongue 14 is received for limited vertical movement. Intermediate the hanger assembly and the guide plates 30, the equalizing bar 16 is provided with an upwardly opening recess 32 within which the lower end of a compression coil spring 34 is seated. The tongue 14 is provided with a bore 36 in alignment with the recess 32 for receiving the upper end of the spring 34. A bolt 38 extends through an aperture 39 concentric with the recess 32, centrally through the spring 34. A washer 40 overlies the top surface of the tongue 14, is mounted upon the bolt 38, and capped by a nut 42. Thus, the bolt 38 locks the tongue 14 longitudinally relative to the equalizing bar 16, but allows limited vertical and horizontal movement between the parts within the limits of the spring 34.

Rearwardly of the bolt 38, the tongue 14 and equalizing bar 16 are provided with pairs of laterally outwardly directed webs 15, 17, in vertical alignment with each other. Bolts 44 extend through the vertically aligned pairs of the webs 15, 17, with nuts 46 mounted upon their uppermost ends in overlying relationship with washers 48 which serve as caps for a pair of compression coil springs 50. These springs 50 yieldably resist vertical separating movement between the tongue 14 and equalizing bar 16, the bolts 44 locking the tongue and equalizing bar together for transmission of a towing force from the towing vehicle to the trailer 12.

It will thus be recognized that through the interaction of the hanger plates 26, cross bar 28, the upstanding guide plates 30, and the bolts 44, the tongue 14 and equalizing bar 16 are virtually maintained in horizontally aligned relationship. However, limited vertical relative movement is achieved through the action of the springs 50, the cross bar 28, and loose fitting compression coil spring 34. This provision for yieldable vertical relative movement between the tongue and equalizing bar allows the towing vehicle and trailer to move vertically relative to each other, such as when striking bumps contoured surfaces of the roadway. Thus, while such vertical movement is accommodated, the springs tend to dampen continued oscillations between these vehicle components, cushion vibrations, and dampen side sway which would otherwise result from a direct unyielding connection. Aside from smoother running operation, the equalizing bar serves to cushion towing shocks which would otherwise be transmitted between the towing vehicle and trailer, thus minimizing repairs and damage to the trailer and vehicle.

While this invention has been described with particular reference to the construction shown in the drawing, it is to be understood that such is not to be construed as imparting limitations upon the invention, which is best defined by the claims appended hereto.

Having thus described my invention, I claim as new and desire to scure by Letters Patent:

1. A tow bar assembly for trailers and towing vehicles comprising, in combination, a tongue for securement at one rear end upon the trailer frame, an equalizing bar having a hitch at one forward end for mounting upon the towing vehicle, upstanding guide means carried upon a central portion of said equalizing bar laterally centering the forward end of said tongue of said equalizing bar, hanger means carried by the rear end of said equalizing bar overlying a central portion of said tongue, and spring means interconnecting intermediate portions of said tongue and said equalizing bar for transmitting the towing force from the towing vehicle to the trailer, said upstanding guide means comprising a pair of plates each secured at one lower end to opposite sides of said equalizing bar and defining a channel therebetween slidably receiving said forward end of said tongue therewithin.

2. A tow bar assembly for trailers as set forth in claim 1, wherein said hanger comprises a pair of plates each secured at one lower end to opposite sides of said rear end of said equalizing bar defining a channel therebetween receiving said tongue therewithin, and a cross bar extending between the upper ends of said hanger plates overlying said tongue.

3. A tow bar assembly for trailers as set forth in claim 2, wherein said spring means comprises a pair of compression coil springs seated vertically upon said tongue, a bolt extending vertically through each of said springs and through said tongue and equalizer bar, whereby said springs yieldably accommodate limited relative angular movement of said tongue and equalizing bar in a vertical plane.

4. A tow bar assembly for trailers as set forth in claim 3, wherein said spring means further comprises a compression coil spring seated within facing recesses of said tongue and equalizing bar forwardly of said pair of compression coil springs.

References Cited by the Examiner

UNITED STATES PATENTS

| | | | |
|---|---|---|---|
| 2,486,605 | 11/49 | Ladd | 280—489 |
| 2,523,733 | 9/50 | Stephens | 280—489 |
| 2,558,123 | 6/51 | Brown et al. | 280—489 X |
| 2,635,892 | 4/53 | Shutter | 280—494 X |
| 2,852,274 | 9/58 | Seiley | 280—489 |

A. HARRY LEVY, *Primary Examiner.*

LEO FRIAGLIA, *Examiner.*